March 26, 1957 L. T. KOPPL 2,786,644
REMOVABLE VALVE
Filed Feb. 12, 1953
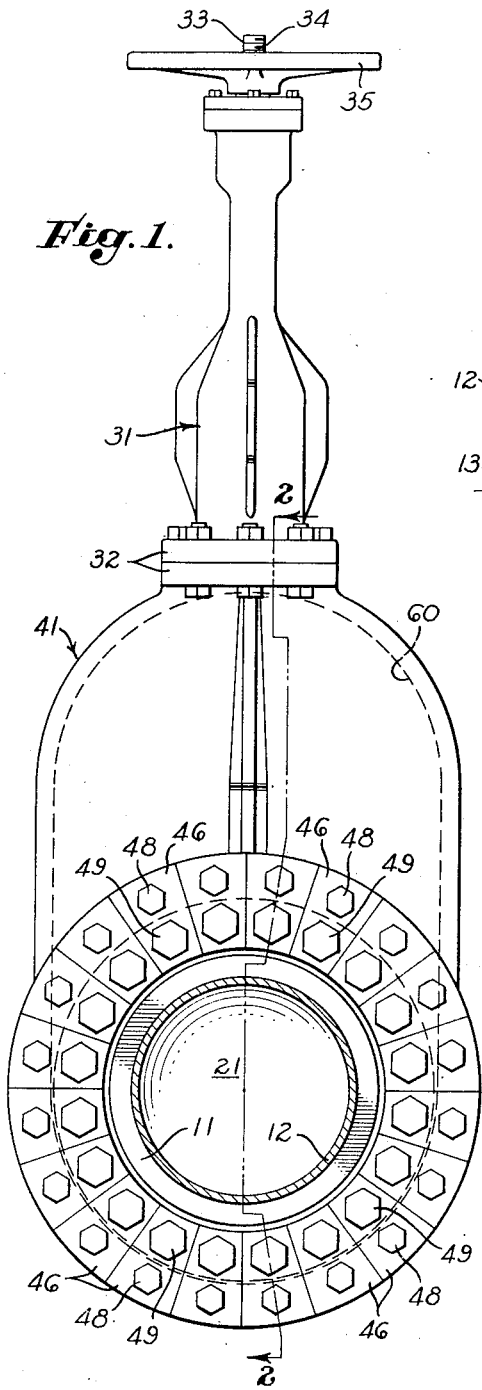
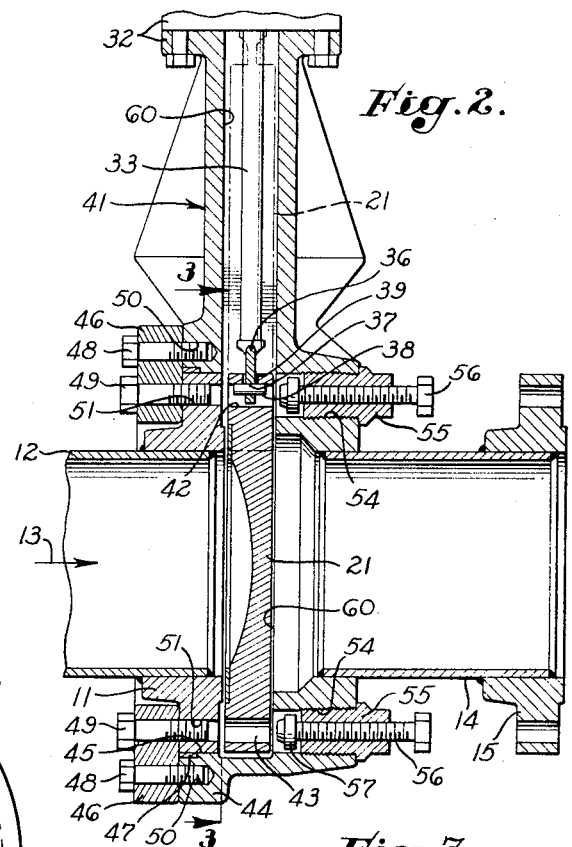
INVENTOR.
LEO T. KOPPL
BY HIS ATTORNEYS.
HARRIS, KIECH, FOSTER & HARRIS

2,786,644

REMOVABLE VALVE

Leo T. Koppl, Montebello, Calif.

Application February 12, 1953, Serial No. 336,474

6 Claims. (Cl. 251—187)

My invention may be embodied in a device such as is illustrated in the drawing and hereinafter described.

An object of the invention is to provide a valve which may be used to close the end of a pipe carrying a fluid such as oil, gas, or water under high super-atmospheric pressure, this valve being attached to a flange on the pipe.

Another object of the invention is to provide a cover for the flange, this cover being the closure member for the valve, and to provide means for bolting the cover to the flange without loss of fluid from the pipe, the remainder of the valve being so attached to the flange that it can be removed for use elsewhere after the end of the pipe has been permanently closed by the cover.

The removable valve is especially desirable for use in connection with pipe lines carrying oil as any substantial loss of oil from such a line represents a substantial money loss. Such lines may be any size from small to the largest diameters. Closure of such a line could, of course, be effected by an ordinary gate valve; such a gate valve for a sixteen inch line would cost about $6,000.00 and the closure produced by such a valve would not be as satisfactory as that produced by bolting a gasketed cover to a flange.

Further objects and advantages of my invention will be made obvious hereinafter.

Referring to the drawing which is for illustrative purposes only:

Fig. 1 is an elevation of the complete device viewed in the direction of the axis of a pipe on which it is used;

Fig. 2 is a section on a plane indicated by the line 2—2 of Fig. 1 of a portion of the device; and Fig. 3 is a section on a plane indicated by the line 3—3 of Fig. 2 of a portion of the device.

The device is shown as attached to a flange 11 which is secured to a pipe 12 which forms a portion of a pipe line. A fluid under pressure passes in a direction indicated by the arrow 13 through the first pipe 12 and through the device into a second pipe 14 which forms a part of the device and which may have a flange 15. The cover 21 which it is desired to bolt to the flange 11 is shown in Fig. 2 in its lowered position preliminary to being bolted in place on the flange.

The body of the device consists of two parts which may be identified as an upper portion 31 and a lower portion 41, the flanges of which are bolted together as shown at 32 in Fig. 1.

The upper portion 31 is a conventional upper portion of any gate valve. A valve stem 33 extends through a conventional stuffing box in the portion 31 and its upper end is threaded as shown at 34 in Fig. 1 to receive a hand wheel 35. Attached to the lower end of the valve stem, as shown in Fig. 3, is a fork 36, each limb of which has a hole 37 to receive a pin 38. Each limb of the fork 36 can enter a slot 39 in the edge of the cover 21. These slots 39 communicate with two holes 42 which are two of a series of holes 43 extending through the cover 21.

The lower portion 41 of the body has a body flange 44 which has a cylindrical opening 45 which surrounds the edge of the flange 11. The flange 11 and the flange 44 are rigidly locked together by a series of segments 46. Packing 47 is placed between the flange 11 and the flange 44, this packing being held in place by the segments 46. Each of the segments 46 has a hole for an outer bolt 48 and a hole for an inner bolt 49. The outer bolts 48 are threaded in holes 50 in the body flange 44 and the inner bolts 49 are threaded in through holes 51 in the flange 11.

Coaxial with each of the through threaded holes 51, but on the opposite side of the lower portion 41 of the body, is a threaded hole 54 which is of sufficient diameter to not only admit the head of an inner bolt 49 but also to admit a socket wrench to rotate such a bolt. Threaded in each of the holes 54 is an externally threaded sleeve 55 which is internally threaded to receive a presser bolt 56 having a head 57 of somewhat larger diameter than the holes 43 which are, however, of sufficiently large diameter to receive the body of an inner bolt 49. The central cavity 60 of the lower portion 41 of the body is sufficiently large to allow the cover 21 to be pulled up in the cavity by the stem 33, operated by the wheel 35 from the position shown in full lines in Fig. 2 to the position shown in dotted lines in Fig. 2 so that there is an open and unimpeded channel between the pipes 12 and 14 through the cavity 60.

The device is secured to the flange as follows, the bolts 48 and 49 and the segments 46 not being in place: The cover 21 is put in place by inserting it into the cavity 60 into the position shown in Fig. 2, this insertion being made through the cylindrical opening 45, and the cover 21 is secured to the stem 33 by the pins 38. The cover is then pulled into its upper position by the rotation of the hand wheel 35. The body portion 41 is then slipped over the flange 11 and secured thereto by the segments 46 and bolts 48 and 49. Fluid may then be passed from the pipe 12 to the pipe 14.

The device may then be used as a valve by lowering the cover 21 into its lower position as shown in Fig. 2 and forcing it into tight relationship with the flange 11 by turning the presser bolts 56. Flow may be resumed by retracting the presser bolts and raising the cover 21 to its upper position.

When, however, it is desired to discontinue permanently or for a long period the flow of fluid through the pipe 13, the cover 21 is lowered to its lower position and the presser bolts 56 are used to seat the cover 21 on the flange 11. One of the bolts 49 and its companion sleeve 55 are then withdrawn and the bolt 49 is inserted in the hole left by the withdrawal of the sleeve 55 passing through a hole 43 and being threaded into the same hole in the flange 11 from which it was withdrawn but from the opposite side. One by one the inner bolts 49 are so withdrawn and replaced. Before the bolts 49 in the two holes 42 are replaced, the pins 38 are driven out of the legs 36 of the stem 33 so that the lower end of the stem may be drawn out of engagement with the cover 21. When all of the bolts 49 have been so shifted, the outer bolts 48 are withdrawn which releases all of the segments and the body 41, including the pipe 14 and flange 15, may be withdrawn from engagement with the flange 11 and the pipe 13 for use elsewhere. The cover 21 then provides a permanent closure for the pipe 12.

I claim as my invention:

1. A device for closing the end of a first pipe containing a fluid under substantial super-atmospheric pressure without allowing any substantial portion of said fluid to escape through said end of said first pipe, which comprises: a flange having a cylindrical outer edge, said flange being rigidly secured to the end of said pipe; a cover adapted to be engaged with said flange in fluid sealing relationship, said cover having a cylindrical outer edge substantially equivalent in diameter to the outer edge of said flange; a body having a cavity large enough to contain said cover in both an upper position and a lower position, said body having a cylindrical opening into said cavity in one side wall of said body, said flange being positioned in said cylindrical opening; a series of segments of an annular ring which extends over the outer radial surface of said flange and over an annular outer radial surface on that portion of the body which surrounds said cylindrical opening; inner and outer bolts securing each of said segments both to said flange and to said body; a stem passing in fluid-tight relationship through an upper wall of said body and extending down into said cavity and detachably connected at its lower end to said cover positioned in said cavity, said stem being movable up and down in said body so that the cover can be moved from its upper to its lower position in said cavity, said cover being so placed when in said upper position as not to substantially retard a fluid flowing in said pipe; a second pipe secured in said body in open communication with said cavity, said second pipe being thus in open communication with said first pipe through said cavity; and presser bolts carried in said body and so placed as to be adapted to force said cover when in its lower position into fluid-tight engagement with said flange.

2. A device as claimed in claim 1 in which the cover has a ring of cover holes near the outer edge thereof, said holes registering with the holes in the flange when said cover is in its lower position, said cover holes being of sufficient diameter to receive the bodies of the inner bolts, said inner bolts being individually removable from said annular ring and flange and engageable with said cover and flange to engage said cover and said flange in fluid sealing relationship.

3. A device as claimed in claim 1 in which the cover has a ring of cover holes near the outer edge thereof, said holes registering with the holes in the flange when said cover is in its lower position, said cover holes being of sufficient diameter to receive the bodies of the inner bolts, said inner bolts being individually removable from said annular ring and flange and engageable with said cover and flange to engage said cover and said flange in fluid sealing relationship, each of said presser bolts being threaded in a sleeve which is threaded in a presser bolt hole in said body, said presser bolt holes being coaxial with the holes in the cover when said cover is in its lower position, said presser bolt holes being of sufficiently large diameter to admit a socket wrench suitable for engaging the head of an inner bolt.

4. A device for closing the end of a first pipe containing a fluid under substantial super-atmospheric pressure without allowing any substantial portion of said fluid to escape through said end of said pipe, which comprises: a flange having a cylindrical outer edge, said flange being rigidly secured to the end of said pipe; a cover adapted to be engaged with said flange in fluid sealing relationship, said cover having a cylindrical outer edge substantially equivalent in diameter to the outer edge of said flange; a body having a cavity large enough to contain said cover in both an upper position and a lower position, said body having a cylindrical opening into said cavity in one side wall of said body; said flange being positioned in said cylindrical opening; an annular ring extending over the outer radial surface of said flange and over an annular outer radial surface on that portion of the body which surrounds said cylindrical opening; inner bolts securing said annular ring to said flange; means for securing said annular ring to said annular outer radial surface of said body; a stem passing in fluid-tight relationship through an upper wall of said body and extending down into said cavity and detachably connected at its lower end to said cover positioned in said cavity, said stem being movable up and down in said body so that the cover can be moved from its upper to its lower position in said cavity, said cover being so placed when in said upper position as not to substantially retard a fluid flowing in said pipe; a second pipe secured in said body in open communication with said cavity, said pipe being thus in open communication with said first pipe through said cavity; and presser bolts carried in said body and so placed as to be adapted to force said cover when in its lower position into fluid-tight engagement with said flange.

5. A device as claimed in claim 4 in which the cover has a ring of cover holes near the outer edge thereof, said holes registering with the holes in the flange when said cover is in its lower position, said cover holes being of sufficient diameter to receive the bodies of the inner bolts, said inner bolts being individually removable from said annular ring and flange and engageable with said cover and flange to engage said cover and said flange in fluid sealing relationship.

6. A device as claimed in claim 4 in which the cover has a ring of cover holes near the outer edge thereof, said holes registering with the holes in the flange when said cover is in its lower position, said cover holes being of sufficient diameter to receive the bodies of the inner bolts, said inner bolts being individually removable from said annular ring and flange and engageable with said cover and flange to engage said cover and said flange in fluid sealing relationship, each of said presser bolts being threaded in a sleeve which is threaded in a presser bolt hole in said body which is coaxial with the holes in the cover when said cover is in its lower position, said presser bolt holes being of sufficiently large diameter to admit a socket wrench suitable for engaging the head of an inner bolt.

References Cited in the file of this patent

UNITED STATES PATENTS

| | | |
|---|---|---|
| 77,448 | Brown | May 5, 1868 |
| 589,091 | French | July 27, 1897 |
| 779,973 | Seitz | Jan. 10, 1905 |
| 1,000,173 | Hughes | Aug. 8, 1911 |
| 1,119,948 | Green | Dec. 8, 1914 |
| 1,711,923 | Davis | May 7, 1929 |